United States Patent
Inoue et al.

(10) Patent No.: US 9,512,923 B2
(45) Date of Patent: *Dec. 6, 2016

(54) SLIDING COMPONENT

(71) Applicant: EAGLE INDUSTRY CO., LTD., Minato-ku, Tokyo (JP)

(72) Inventors: Hideyuki Inoue, Tokyo (JP); Takeshi Hosoe, Tokyo (JP); Yuta Negishi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/385,941

(22) PCT Filed: May 15, 2013

(86) PCT No.: PCT/JP2013/063500
§ 371 (c)(1),
(2) Date: Sep. 17, 2014

(87) PCT Pub. No.: WO2013/176011
PCT Pub. Date: Nov. 28, 2013

(65) Prior Publication Data
US 2015/0084286 A1 Mar. 26, 2015

(30) Foreign Application Priority Data
May 21, 2012 (JP) .................................. 2012-116041

(51) Int. Cl.
*F16J 15/34* (2006.01)
*F16C 33/76* (2006.01)
(Continued)

(52) U.S. Cl.
CPC .......... *F16J 15/3424* (2013.01); *F16C 33/743* (2013.01); *F16C 33/763* (2013.01);
(Continued)

(58) Field of Classification Search
CPC .... F16J 15/441; F16J 15/3412; F16J 15/342; F16J 15/3244; F16J 15/3424; F16C 33/743; F16C 33/763; F16C 33/7823; F16C 33/107; F16C 2240/42; F16C 2240/46; F16C 2240/54

USPC .......................................................... 277/399
See application file for complete search history.

(56) References Cited

U.S. PATENT DOCUMENTS 1,902,621 A * 3/1933 Davis et al. ................... 428/612
3,640,541 A * 2/1972 Taschenberg ................. 277/400
(Continued)

FOREIGN PATENT DOCUMENTS

| EP | 0684413 A1 | 11/1995 |
|---|---|---|
| JP | 1992-048468 U | 4/1992 |

(Continued)

OTHER PUBLICATIONS

Notification of Transmittal of Translation of the International Preliminary Report on Patentability (PCT/IB/338) mailed Dec. 4, 2014, with International Preliminary Report on Patentability (PCT/IB/373) and Written Opinion of the International Searching Authority (PCT/ISA/237), for corresponding international application PCT/JP2013/063500.

(Continued)

*Primary Examiner* — Kristina Fulton
*Assistant Examiner* — Nathan Cumar
(74) *Attorney, Agent, or Firm* — Law Office of Katsuhiro Arai

(57) ABSTRACT

A sliding component is characterized in that, on one sealing face of a pair of sliding parts that slide relative to each other, multiple positive pressure-generating mechanisms that include extremely shallow parallel grooves running roughly in parallel with the sealing face and having submicron-level height differences are provided independently in the circumferential direction, and that extremely shallow thin grooves are formed on the sealing face on the low-pressure fluid side of the extremely shallow parallel grooves, wherein the extremely shallow parallel grooves communicate with the high-pressure fluid side, and the extremely shallow thin grooves communicate with the extremely shallow parallel grooves, but are isolated from the low-pressure fluid side by a seal area, thereby reducing a leakage rate of sealed fluid and significantly improving lubrication characteristics at startup or stop at the same time.

20 Claims, 5 Drawing Sheets

(51) Int. Cl.
*F16C 33/74* (2006.01)
*F16C 33/78* (2006.01)
*F16C 33/10* (2006.01)

(52) U.S. Cl.
CPC ......... *F16C33/7823* (2013.01); *F16C 33/107* (2013.01); *F16C 2240/42* (2013.01); *F16C 2240/46* (2013.01); *F16C 2240/54* (2013.01)

(56) References Cited

U.S. PATENT DOCUMENTS

| | | | | |
|---|---|---|---|---|
| 5,092,612 | A | * | 3/1992 | Victor et al. ............... 277/400 |
| 5,529,318 | A | * | 6/1996 | Fuse .................... F16J 15/3412 |
| | | | | 277/400 |
| 2001/0035593 | A1* | | 11/2001 | Peiffer .................. B29C 55/143 |
| | | | | 264/176.1 |
| 2007/0187903 | A1* | | 8/2007 | Berdichevsky ............... 277/559 |
| 2011/0101616 | A1* | | 5/2011 | Teshima ............... F16J 15/3424 |
| | | | | 277/358 |

FOREIGN PATENT DOCUMENTS

| | | |
|---|---|---|
| JP | 2009-014183 A | 1/2009 |
| JP | 2011-196429 A | 10/2011 |
| WO | 2009/087995 A1 | 7/2009 |

OTHER PUBLICATIONS

International Search Report mailed Jul. 2, 2013, issued for International Application No. PCT/JP2013/063500.
An Office Action issued by the State Intellectual Property Office of China, mailed Jul. 9, 2015, with a search report for Chinese counterpart application No. 201380014090.3.

* cited by examiner (a)

(b)

(c)

SLIDING COMPONENT

This application is the U.S. National Phase under 35 U.S.C. §371 of International Application PCT/JP2013/063500, filed May 15, 2013, which claims priority to Japanese Patent Application No. 2012-116041, filed May 21, 2012. The International Application was published under PCT Article 21(2) in a language other than English.

TECHNICAL FIELD

The present invention relates to a sliding component suitable for mechanical seals, bearings, and other sliding mechanisms. In particular, the present invention relates to a sliding component for seal rings, bearings, and other mechanisms where fluid is present on the sealing face to reduce friction and leakage of fluid from the sealing face must be prevented.

BACKGROUND ART

With a mechanical seal, which is an example of a sliding component, the mutually exclusive conditions of "seal" and "lubricate" must be satisfied simultaneously in order to maintain its sealing performance for an extended time. Particularly in recent years, to help protect the environment, etc., there is a growing need to lower friction further and thereby reduce mechanical loss, while still preventing leakage of the fluid being sealed. Friction can be lowered by creating a so-called fluid lubrication state, which represents a state of surfaces sliding against each other with a liquid film in between, achieved by generating dynamic pressure between the sealing faces by means of rotation. In this case, however, generation of positive pressure between the sealing faces causes the fluid to flow out of the sealing faces from the positive pressure area. This is so-called side leakage that occurs with a bearing, which corresponds to leakage in the case of a seal. When the fluid to be sealed is present on the outer periphery side of the seal area and atmosphere on the inner periphery side, and the fluid on the outer periphery side is sealed in this state (referred to as the "inside type"), the leakage rate on the inner periphery side is expressed by the formula below:

$$Q = -\int \left( \frac{h^3}{12\eta} \frac{\partial p}{\partial r} \bigg|_{r=r_1} \right) r_1 \cdot d\theta \quad \text{\{Mathematical Formula 1\}}$$

Q: Leakage rate on the inner periphery side at the inner diameter r1 of the sealing face (The negative sign indicates leakage.)
h: Height of clearance
η: Viscosity of fluid
p: Pressure From the above formula, it is clear that the pressure slope ∂p/∂r at the inner periphery side increases as fluid lubrication is promoted, dynamic pressure generates, and liquid film forms, and as a result of a larger h, the leakage rate Q increases.

In the case of a seal, therefore, the clearance h and pressure slope ∂p/∂r must be decreased in order to reduce the leakage rate Q.

As for the friction characteristics of a slide bearing, which are similar to those of a mechanical seal, the "Stribeck curve" shown in FIG. 4 is known (Reference Literature: "Tribology" by H. Czichos, Kodansha).

The horizontal axis in FIG. 4 represents "Viscosity η×Velocity v/Load $F_N$," or simply the velocity if the viscosity and load are constant. If the viscosity and load are constant, the friction coefficient is small in the medium-speed region or mixed lubrication region "Second: h (clearance)≅R (roughness)" and the high-speed region or fluid lubrication region "First: h (clearance)>>R (roughness)," but the friction coefficient becomes extremely large at startup in the boundary lubrication region "Third: h (clearance)→0."

According to the numerical analysis conducted by the inventors named in the present application for patent, on the other hand, the groove depth on the sealing face and friction coefficient of the sealing face have the relationship shown in FIG. 5 in the case of a mechanical seal, and the relationship between the groove depth and friction coefficient of the sealing face varies depending on the sliding speed of the sealing face.

Also, generally dynamic pressure-generating grooves are provided on a mechanical seal to ensure the mechanical seal is effective in the normal rotational speed region and also to guide sufficient fluid to the sealing face, and these dynamic pressure-generating grooves are processed to a depth of several μm or more by means of machining, blasting, or laser. Because of this, low friction is achieved in the medium-speed region and high-speed region, but sufficient load capacity cannot be achieved in the low-speed region, which makes it difficult to achieve low friction in this speed region. Particularly at startup and stop where sufficient dynamic pressure does not generate, sufficient lubrication characteristics are not demonstrated and problems occur as a result, such as noise and excessive contact between the sealing faces at startup and stop.

Also in recent years, sliding materials for mechanical seals are proposed that can reduce the friction coefficient without generating excessive leakage by introducing the sealed fluid to the space between the sealing faces and holding it there in good condition, including one where multiple dynamic pressure-generating grooves are provided in the circumferential direction to generate dynamic pressure between the sealing faces as a result of one sealing face rotating relative to the mating sealing face, wherein the dynamic pressure-generating grooves comprise straight grooves or curved spiral grooves having an angle to the sliding direction and the dynamic pressure-generating grooves are processed to a depth of 1 μm or less by means of femtosecond laser (refer to Patent Literatures 1 and 2, for example).

However, the inventions described in Patent Literatures 1 and 2 aim to generate dynamic pressure between the sealing faces as a result of one sealing face rotating relative to the mating sealing face, and although low friction is achieved in the medium- and high-speed regions at high pressure, sufficient dynamic pressure is not generated and thus sufficient lubrication characteristics cannot be demonstrated in the medium- and high-speed regions at low pressure or at startup and stop, which presents a problem. In addition, the mechanism of introducing the sealed fluid into the space between the sealing faces by the dynamic pressure-generating grooves requires circular grooves or other means for preventing leakage to be provided on the low-pressure side of the sealing face, in order to reduce the leakage rate.

PRIOR ART LITERATURES

Patent Literatures

Patent Literature 1: International Patent Laid-open No. 2009/087995

Patent Literature 2: Japanese Patent Laid-open No. 2011-196429

SUMMARY OF INVENTION

Problems to be Solved by Invention

An object of the present invention is to provide a sliding component that reduces the leakage rate of sealed fluid and significantly improves the lubrication characteristics at startup or stop, while being actuated by means of fluid lubrication in the rotation phase, thereby achieving the effects of sealing and lubrication at the same time.

Means to Solve Problems

To achieve the aforementioned object, firstly the sliding component proposed by the present invention is characterized in that: on one sealing face of a pair of sliding parts that slide relative to each other, multiple positive pressure-generating mechanisms that comprise extremely shallow parallel grooves running roughly in parallel with the sealing face and having submicron-level height differences are provided independently in the circumferential direction; extremely shallow thin grooves are formed on the sealing face on the low-pressure fluid side of the extremely shallow parallel grooves; the extremely shallow parallel grooves communicate with the high-pressure fluid side; and the extremely shallow thin grooves communicate with the extremely shallow parallel grooves, but are isolated from the low-pressure fluid side by a seal area.

According to the first feature, the sealed fluid entering the extremely shallow parallel grooves forms an extremely thin fluid film and the action of its surface tension increases the pressure region where the fluid can be sealed without increasing leakage, while in the rotation phase the relative sliding of the applicable sealing face with the mating sealing face generates dynamic pressure so that the sealing face can be lifted by the minimum required amount as a result of the dynamic pressure effect. In addition, the extremely shallow thin grooves formed on the sealing face on the low-pressure fluid side of the extremely shallow parallel grooves allow for control of the flow of fluid on the sealing face on the low-pressure fluid side of the extremely shallow parallel grooves, and by setting the extremely shallow thin grooves in a desired direction and thereby adjusting the flow direction of fluid on the sealing face so that the fluid will flow over the entire sealing face, or by guiding the fluid taken into the sealing face to be discharged to the high-pressure fluid side, the lubrication feature of the sealing face can be improved and leakage reduced at the same time.

In addition to the first feature, secondly, the sliding component proposed by the present invention is characterized in that: the extremely shallow parallel grooves have a depth h of 10 nm to 1 μm and roughness α of 1 to 100 nm at the bottom of the groove, where the relationship of h>α is satisfied; and the extremely shallow thin grooves have a depth h equivalent to that of the extremely shallow parallel grooves and pitch p of 1 to 500 μm.

In addition to the second feature, thirdly, the sliding component proposed by the present invention is characterized in that preferably the extremely shallow parallel grooves have a depth h of 50 to 500 nm and roughness α of 1 to 30 nm at the bottom of the groove, where the relationship of h>α is satisfied.

According to the second and third features, the lubrication characteristics of the sealing face can be improved and leakage reduced further at the same time.

In addition to any one of the first through third features, fourthly, the sliding component proposed by the present invention is characterized in that the extremely shallow thin grooves are formed in a manner inclined by a specified angle relative to the sliding direction of the sealing face.

According to the fourth feature, the fluid on the sealing face can be rectified to flow toward a desired direction, so that the lubrication characteristics at start or stop can be improved significantly without increasing leakage.

In addition to the fourth feature, fifthly, the sliding component proposed by the present invention is characterized in that the extremely shallow thin grooves are formed in a manner inclined in the same direction as the rotating direction of the mating sealing face.

According to the fifth feature, the fluid on the sealing face can be rectified to flow to the low-pressure fluid side, so that the sealing face can be sufficiently lubricated.

In addition to the fourth feature, sixthly, the sliding component proposed by the present invention is characterized in that the extremely shallow thin grooves are formed in a manner inclined in the direction opposite to the rotating direction of the mating sealing face.

According to the sixth feature, the fluid on the sealing face can be rectified to flow to the high-pressure fluid side, so that leakage to the low-pressure fluid side can be prevented further.

In addition to the fourth feature, seventhly, the sliding component proposed by the present invention is characterized in that the extremely shallow thin grooves are formed in such a way that the adjacent extremely shallow thin grooves are oriented in directions symmetrical relative to the sliding direction of the sealing face.

According to the seventh feature, the fluid on the sealing face is taken in from the high-pressure fluid side to the low-pressure fluid side and discharged to the high-pressure fluid side, so that the sealing face can be lubricated sufficiently and leakage to the low-pressure fluid side can be prevented further. This is also advantageous when the sliding component rotates in both directions.

In addition to any one of the first through third features, eighthly, the sliding component proposed by the present invention is characterized in that the extremely shallow thin grooves are formed along the radial direction.

According to the eighth feature, the fluid on the sealing face is rectified to flow to the low-pressure fluid side from the extremely shallow parallel grooves, so that the fluid flows into the entire sealing face with ease even at startup or stop of the sliding component and consequently the lubrication characteristics of the sliding component at startup or stop can be improved. From the viewpoint of preventing leakage, these characteristics are suitable when the seal area formed between the extremely shallow thin grooves and inner periphery of the seal area is wide.

In addition to any one of the first through eighth features, ninthly, the sliding component proposed by the present invention is characterized in that preferably the extremely shallow parallel grooves are provided to account for 40 to 70% of the area of the sealing face.

According to the ninth feature, the surface pressure of the sealing face can be kept in good condition, while at the same time leakage can be reduced and the lubrication characteristics at startup or stop can be improved significantly.

In addition to any one of the first through ninth features, tenthly, the sliding component proposed by the present invention is characterized in that the pair of sliding parts is comprised of ring-shaped bodies each used as either a stationary-side sliding member or rotating-side sliding member of a mechanical seal that rotates relative to the other member.

According to the tenth feature, a mechanical seal that can maintain good lubrication performance without increasing leakage and also significantly improve the lubrication characteristics at startup or stop in particular can be obtained. The flow of fluid on the sealing face can also be controlled, which leads to improved lubrication characteristics of the sealing face and reduced leakage at the same time.

Effects of Invention

The present invention has the excellent effects listed below:

(1) On one sealing face of a pair of sliding parts that slide relative to each other, multiple positive pressure-generating mechanisms that comprise extremely shallow parallel grooves running roughly in parallel with the sealing face and having submicron-level height differences are provided independently in the circumferential direction; extremely shallow thin grooves are formed on the sealing face on the low-pressure fluid side of the extremely shallow parallel grooves; the extremely shallow parallel grooves communicate with the high-pressure fluid side; and the extremely shallow thin grooves communicate with the extremely shallow parallel grooves, but are isolated from the low-pressure fluid side by a seal area; and because of the above, the sealed fluid entering the extremely shallow parallel grooves forms an extremely thin fluid film and the action of its surface tension increases the pressure region where the fluid can be sealed without increasing leakage, while in the rotation phase the relative sliding of the applicable sealing face with the mating sealing face generates dynamic pressure so that the sealing face can be lifted by the minimum required amount as a result of the dynamic pressure effect. In addition, the extremely shallow thin grooves formed on the sealing face on the low-pressure fluid side of the extremely shallow parallel grooves allow for control of the flow of fluid on the sealing face on the low-pressure fluid side of the extremely shallow parallel grooves, and by setting the extremely shallow thin grooves in a desired direction and thereby adjusting the flow direction of fluid on the sealing face so that the fluid will flow over the entire sealing face or by guiding the fluid taken into the sealing face to be discharged to the high-pressure fluid side, the lubrication characteristics of the sealing face can be improved and leakage reduced at the same time.

(2) The extremely shallow thin grooves are formed in a manner inclined by a specified angle relative to the sliding direction of the sealing face, and accordingly the fluid on the sealing face S can be rectified to flow toward a desired direction, so that the lubrication characteristics at startup or stop can be significantly improved without increasing leakage.

(3) The extremely shallow thin grooves are formed in a manner inclined in the same direction as the rotating direction of the mating sealing face, and accordingly the fluid on the sealing face can be rectified to flow to the low-pressure fluid side, so that the sealing face can be sufficiently lubricated.

(4) The extremely shallow thin grooves are formed in a manner inclined in the direction opposite to the rotating direction of the mating sealing face, and accordingly the fluid on the sealing face can be rectified to flow to the high-pressure fluid side, so that leakage to the low-pressure fluid side can be prevented further.

(5) The extremely shallow thin grooves are formed in such a way that the adjacent extremely shallow thin grooves are oriented in the directions symmetrical relative to the sliding direction of the sealing face, and accordingly the fluid on the sealing face is taken in from the high-pressure fluid side to the low-pressure fluid side and discharged to the high-pressure fluid side, so that the sealing face can be lubricated sufficiently and leakage to the low-pressure fluid side can be prevented further. This is also advantageous when the sliding component rotates in both directions.

(6) The extremely shallow thin grooves are formed along the diameter direction, and accordingly the fluid on the sealing face is rectified to flow to the low-pressure fluid side from the extremely shallow parallel grooves, so that the fluid flows into the entire sealing face with ease even at the startup or stop of the sliding component and consequently the lubrication characteristics of the sliding component at startup or stop can be improved. From the viewpoint of preventing leakage, these characteristics are suitable when the seal area formed between the extremely shallow thin grooves and inner periphery of the seal area is wide.

(7) Preferably the extremely shallow parallel grooves are provided to account for 5 to 70% of the area of the sealing face, and accordingly the surface pressure of the sealing face can be kept in a good condition, while at the same time leakage can be reduced and the lubrication characteristics at start or stop can be improved significantly.

(8) The pair of sliding parts is characterized by being comprised of ring-shaped bodies each used as either a stationary-side sliding member or rotating-side sliding member of a mechanical seal that rotates relative to the other member.

According to the tenth feature, a mechanical seal that can maintain good lubrication performance without increasing leakage and also significantly improve the lubrication characteristics at startup or stop in particular can be obtained. The flow of fluid on the sealing face can also be controlled, which leads to improved lubrication characteristics of the sealing face and reduced leakage at the same time.

MODES FOR CARRYING OUT THE INVENTION

Figure 1:
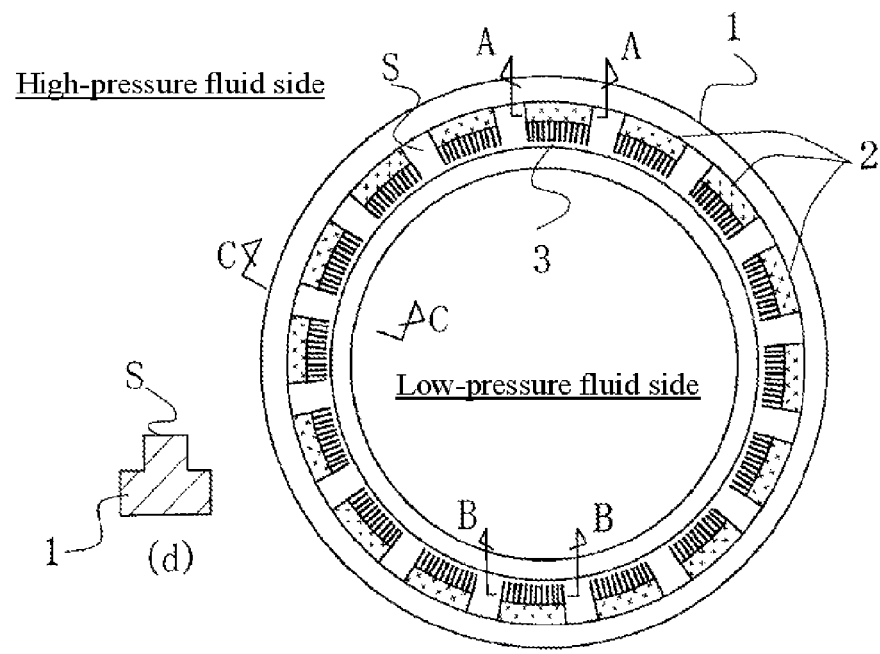
FIG. 1 Drawings explaining the sealing face of a sliding component pertaining to an embodiment of the present invention, where (a) is a plan view of the sealing face, (b) is a section view taken along A-A, (c) is a section view taken along B-B, and (d) is a section view taken along C-C.
Figure 1:
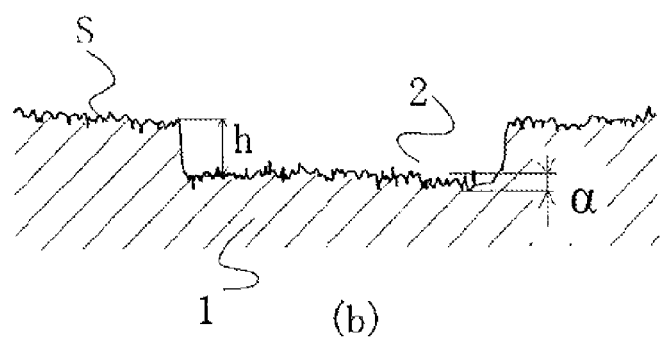
Figure 1:
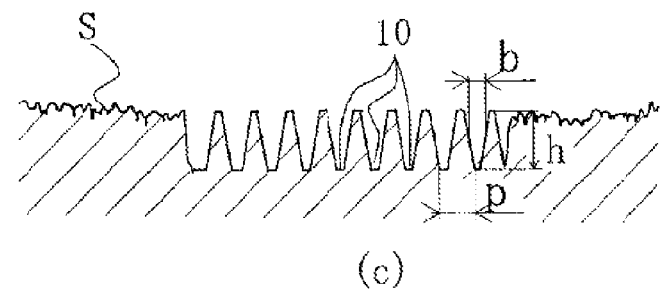

Modes for carrying out a sliding component pertaining to the present invention are explained in detail by referring to the drawings, but it should be noted that the present invention should not be interpreted in a limited way according to these embodiments alone, and various modifications, corrections and improvements may be added based on the knowledge of those skilled in the art so long as they do not deviate from the scope of the present invention.

The sliding component pertaining to an embodiment of the present invention is explained by referring to FIGS. 1 to 4.

As shown in FIG. 1 (a), a sliding component 1 constitutes a ring-shaped body and normally high-pressure sealed fluid is present on one side of the inner/outer peripheries of the sealing face S of the sliding component 1, while atmosphere is present on the other side.

This sealed fluid can be effectively sealed using the sliding component 1. For example, this sliding component 1 is used as one of the pairs of seal ring for rotation and seal ring for fixing in mechanical seal devices. The sealing face of the seal ring for rotation is contacted with the sealing face of the seal ring for fixing facing the seal ring for rotation, to seal the sealed fluid present on either the inner periphery or outer periphery of the sealing face. The sliding component can also be used as a bearing that slides against its rotating axis while sealing lubricating oil on one side of the cylindrical sealing face in the axial direction.

In FIG. 1, a case where high-pressure sealed fluid is present on the outer periphery side is explained for the sake of convenience.

In the illustrated example, the section of the sliding component 1 has a convex shape as shown in FIG. 1 (d) and its top face constitutes a sealing face S. This sealing face S has multiple positive pressure-generating mechanisms provided on it independently in the circumferential direction, which are running roughly in parallel with the sealing face S and constituted by extremely shallow parallel grooves 2 having submicron-level height differences, as shown in FIG. 1 (b). The extremely shallow parallel grooves 2 are provided not over the entire width of the sealing face S in the diameter direction, but only in an area closer to the high-pressure fluid side, and communicate with the high-pressure fluid side. Extremely shallow thin grooves 10 are formed on the sealing face S on the low-pressure fluid side of the extremely shallow parallel grooves 2, where the extremely shallow thin grooves 10 communicate with the extremely shallow parallel grooves 2 on one side in the diameter direction, while being isolated from the low-pressure fluid side by a seal area 3 on the other side.

If extremely shallow thin grooves 10 are not formed, the entire area on the low-pressure fluid side of the extremely shallow parallel grooves 2 constitutes the seal area 3, but this seal area 3 has such properties that it achieves good lubrication characteristics but increases the chances of leakage when narrow in the diameter direction, and decreases the chances of leakage but achieves poor lubrication characteristics when wide in the diameter direction. For this reason, under the present invention extremely shallow parallel grooves 2 are provided on the high-pressure fluid side of the sealing face S, while extremely shallow thin grooves 10 with a function to control the flow of fluid are also provided in parts of the sealing face S on the low-pressure fluid side of the extremely shallow parallel grooves 2, so that the extremely shallow thin grooves 10 are isolated from the low-pressure fluid side by a seal area 3 which is relatively narrow in the diameter direction.

The extremely shallow parallel grooves 2 are set in such a way that their depth h is in a range of 10 nm to 1 μm and roughness α at the bottom of the groove is in a range of 1 to 100 nm, and the relationship of "Groove depth h>Roughness α at the bottom of the groove" is satisfied.

In addition, preferably the extremely shallow parallel grooves 2 are set in such a way that their depth h is in a range of 50 to 500 nm and roughness α at the bottom of the groove is in a range of 1 to 30 nm, and the relationship of "Groove depth h>Roughness α at the bottom of the groove" is satisfied.

On the other hand, the extremely shallow thin grooves 10 are such that their depth h is equivalent to the depth of the extremely shallow parallel grooves 2 and pitch p is 1 to 500 μm. Also, the width b of the extremely shallow thin grooves 10 is equal to or less than the pitch p. The extremely shallow thin grooves 10 have a section shape of roughly a square groove in FIG. 1 (c), but the section shape is not at all limited to the foregoing and a wave shape or saw-tooth blade shape is also acceptable, for example.

Now, the "positive pressure-generating mechanisms constituted by extremely shallow parallel grooves" under the present invention are explained.

Since the extremely shallow parallel grooves 2 constituting the positive pressure-generating mechanisms are extremely shallow, represented by their depth h in a range of 10 nm to 1 μm, for example, while their roughness α at the bottom of the groove is in a range of 1 to 30 nm and the relationship of "Groove depth h>Roughness α at the bottom of the groove" is also satisfied, the sealed fluid entering the extremely shallow parallel grooves 2 forms an extremely thin fluid film and the action of its surface tension increases the pressure region where the fluid can be sealed without increasing leakage. In the rotation phase, dynamic pressure generates as a result of the applicable sealing face sliding relative to the mating sealing face and the sealing face is lifted by the dynamic pressure effect. By providing the minimum required number of these positive pressure-generating mechanisms constituted by the extremely shallow parallel grooves 2, the lubrication characteristics at startup or stop can be improved significantly without increasing leakage.

Figure 2:
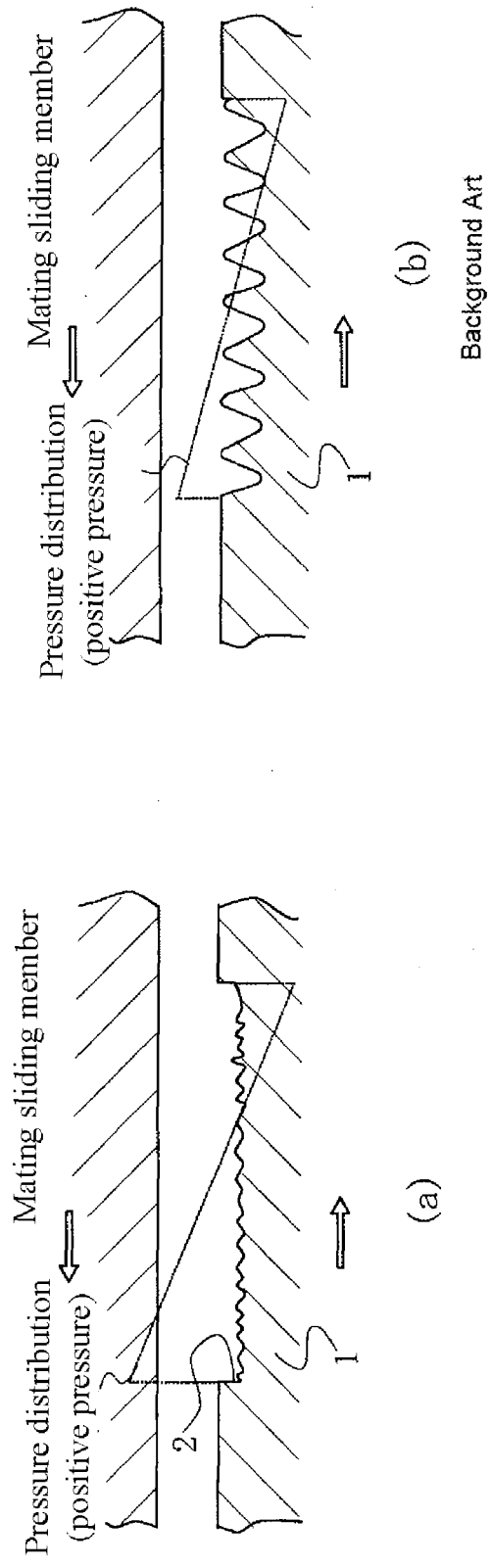
FIG. 2 Drawings explaining the dynamic pressure effect, where (a) represents the present invention, while (b) represents prior art.

How dynamic pressure generates as a result of the applicable sealing face sliding relative to the mating sealing face and the sealing face is lifted by the dynamic pressure effect during the rotation phase is explained in detail by referring to FIG. 2.

As shown in FIG. 2 (a), under the present invention the extremely shallow parallel grooves 2 are extremely shallow and satisfy the relationship of "Groove depth h>Roughness α at the bottom of the groove" and therefore the dynamic pressure generating as a result of the applicable sealing face sliding relative to the mating sealing face has a large pressure distribution.

In the case of prior art, on the other hand, the dynamic pressure-generating grooves are formed in such a way that the height is roughly the same as the depth of the grooves, as shown in FIG. 2 (b), and therefore the dynamic pressure generating as a result of the applicable sealing face sliding relative to the mating sealing face has a smaller pressure distribution compared to that under the present invention.

As mentioned above, under the present invention the extremely shallow parallel grooves 2 are extremely shallow and satisfy the relationship of "Groove depth h>Roughness α at the bottom of the groove" and therefore the sealed fluid entering the extremely shallow parallel grooves 2 forms an extremely thin fluid film and the action of its surface tension increases the pressure region where the fluid can be sealed without increasing leakage, while lubrication effect is demonstrated in the rotation phase.

Also, preferably the extremely shallow parallel grooves 2 are provided to account for 5 to 70% of the area of the sealing face S. While the extremely shallow parallel grooves 2 are equally distributed at 16 locations in the circumferential direction in the illustrated example, their distribution is not at all limited to the foregoing and it suffices that they are equally distributed at two locations at a minimum, for example.

The sealing face S itself is set, by mirror-surface finishing, to a level of roughness at which the extremely shallow parallel grooves 2 become clearly recognizable.

Next, the "extremely shallow thin groove" under the present invention is explained.

The extremely shallow thin grooves 10 are provided to control the flow of fluid on the sealing face S on the low-pressure fluid side of the extremely shallow parallel grooves 2, and the extremely shallow thin grooves can be set in a desired direction to adjust the flow direction of fluid on the sealing face so that the fluid will flow over the entire sealing face or guide the fluid taken into the sealing face to be discharged to the high-pressure fluid side.

In other words, the extremely shallow thin grooves 10 formed on the sealing face S on the low-pressure fluid side of the extremely shallow parallel grooves 2 control the flow of fluid on the sealing face S on the low-pressure fluid side of the extremely shallow parallel grooves 2 and, for example, if the seal area 3 formed between the extremely shallow parallel grooves 2 and inner periphery of the seal area is wide, the extremely shallow thin grooves 10 are provided in this space so as to take in the fluid to improve the sliding characteristics, and also to rectify the flow of fluid on the sealing face in an optimal direction which has been difficult to control with the extremely shallow parallel grooves 2 alone, thereby improving the lubrication characteristics of the sealing face while reducing leakage at the same time which has been difficult to do with the extremely shallow parallel grooves 2 alone.

These extremely shallow parallel grooves 2 provided on the high-pressure fluid side, and extremely shallow thin grooves 10 provided on the sealing face S on the low-pressure fluid side of the extremely shallow parallel grooves 2, are processed by means of etching, for example. However, the method is not at all limited to etching and any other processing method may be used so long as it can form the extremely shallow parallel grooves 2 and extremely shallow thin grooves 10.

Figure 3:
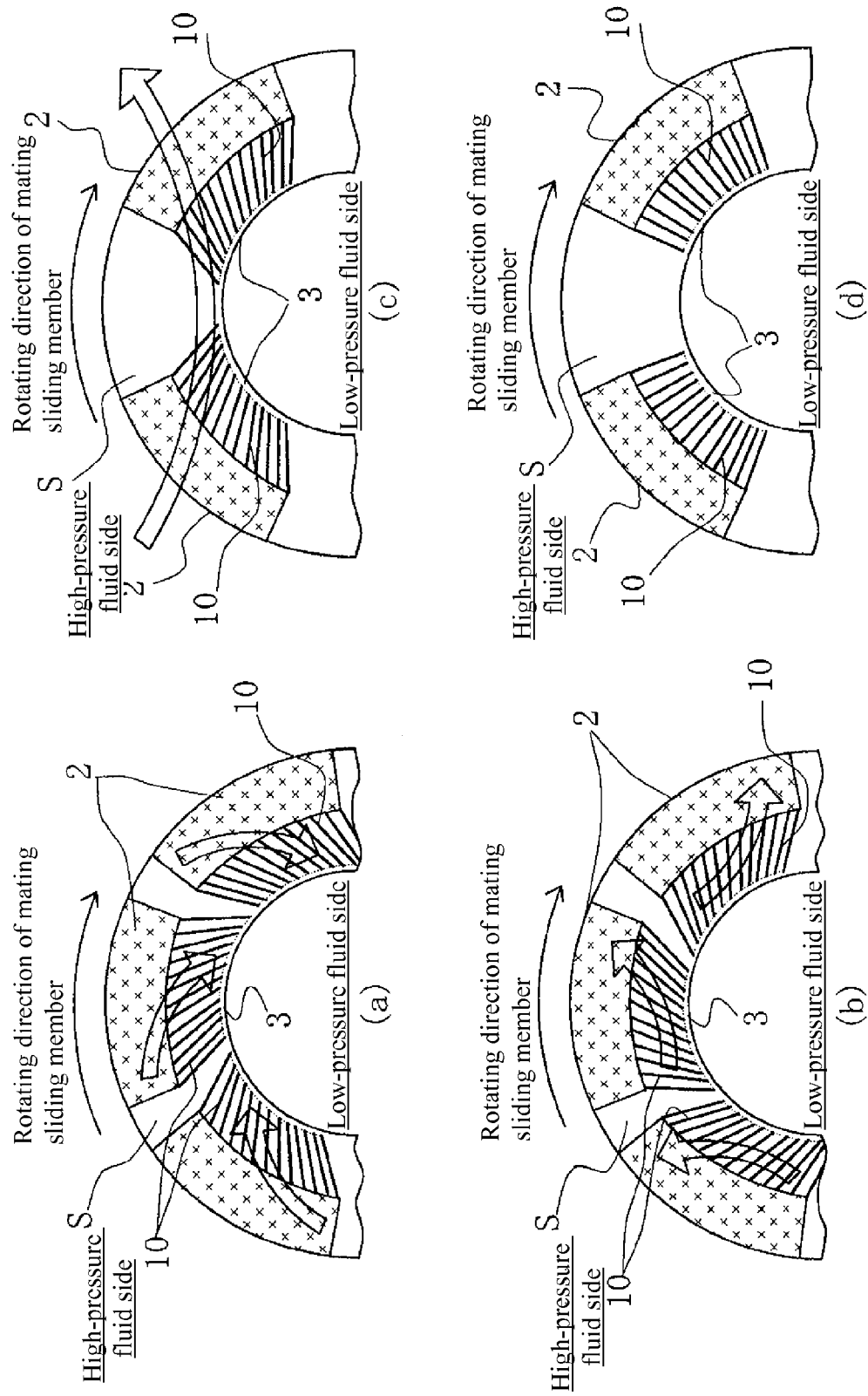
FIG. 3 Drawings showing extremely shallow thin grooves formed on seal areas, where (a) shows extremely shallow thin grooves formed in a manner inclined in the same direction as the rotating direction of the mating sliding member, (b) shows extremely shallow thin grooves formed in a manner inclined in the direction opposite to the rotating direction of the mating sliding member, (c) shows adjacent extremely shallow thin grooves formed in a manner symmetrical relative to the sliding direction of the sealing face, and (d) shows extremely shallow thin grooves formed along the diameter direction.
Figure 4:
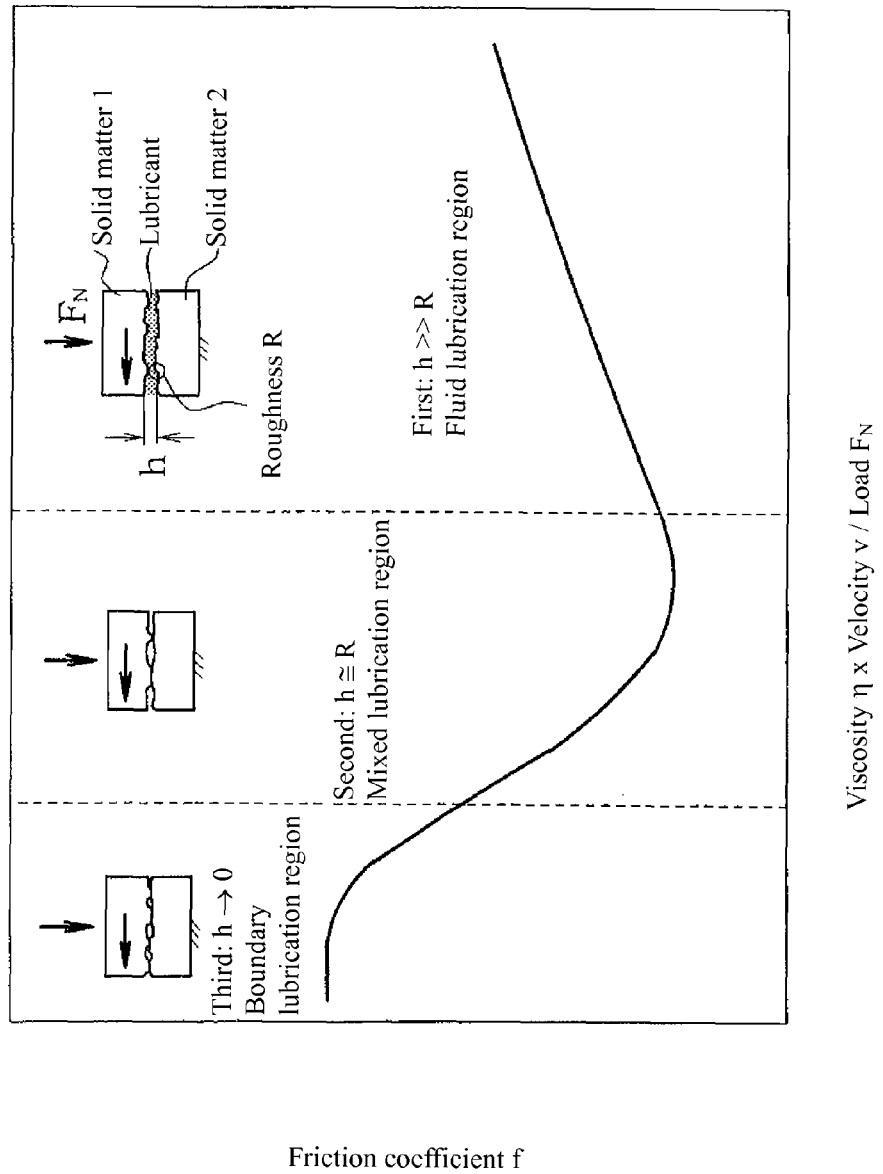
FIG. 4 Drawing explaining the friction characteristics of a bearing, where the horizontal axis represents the bearing characteristic number G (non-dimensional), while the vertical axis represents the friction coefficient f.
Figure 5:
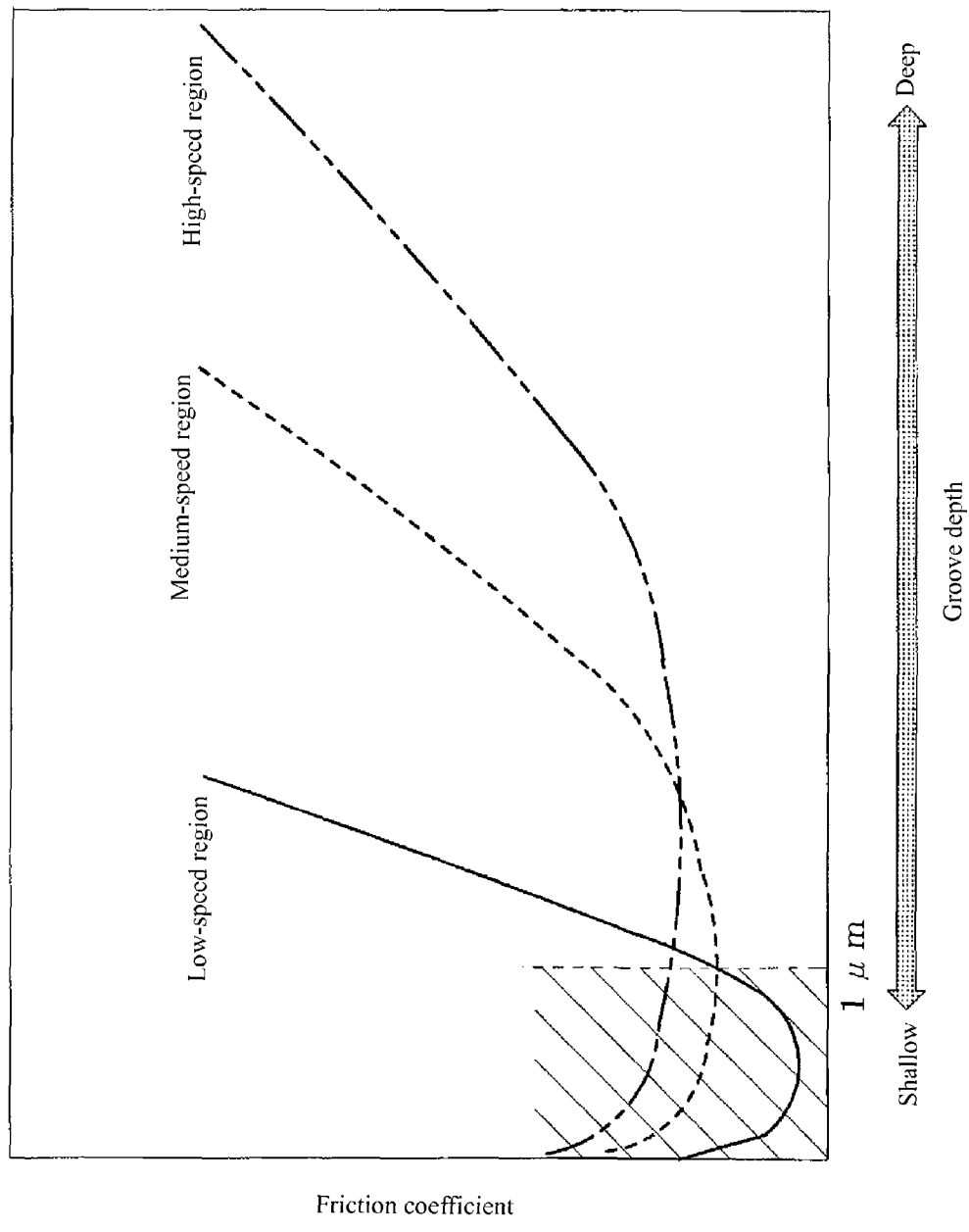
FIG. 5 Relationship between the depth of grooves on the sealing face of a mechanical seal on one hand, and friction coefficient of the sealing face on the other, obtained at each sliding speed of the sealing face.

Next, the extremely shallow thin grooves 10 are explained in detail by referring to FIG. 3.

The extremely shallow thin grooves 10 are provided to control the flow of fluid on the sealing face S on the low-pressure fluid side of the extremely shallow parallel grooves 2, and are formed in a specific direction.

In FIG. 3 (a), the extremely shallow thin grooves 10 are formed in a manner inclined in the same direction as the rotating direction of the mating sliding member from the outer side to inner side in the diameter direction, and all extremely shallow thin grooves 10 are formed in the same direction. Accordingly, when the mating sliding member rotates in the clockwise direction, the fluid on the sealing face S is rectified to flow to the low-pressure fluid side as indicated by the arrows, and consequently the sealing face S is sufficiently lubricated and leakage to the low-pressure fluid side is suppressed by the seal area 3.

In FIG. 3 (b), the extremely shallow thin grooves 10 are formed in a manner inclined in the direction opposite to the rotating direction of the mating sliding member from the outer side to inner side in the diameter direction, and all extremely shallow thin grooves 10 are formed in the same direction. Accordingly, when the mating sliding member rotates in the clockwise direction, the fluid on the sealing face S is rectified to flow to the high-pressure fluid side as indicated by the arrows and leakage to the low-pressure fluid side is prevented further.

In FIG. 3 (c), the extremely shallow thin grooves 10 are formed in such a way that the adjacent extremely shallow thin grooves are inclined in the directions symmetrical relative to the rotating direction of the mating sliding member. Accordingly, the fluid on the sealing face S is taken in from the high-pressure fluid side to low-pressure fluid side as indicated by the arrow and rectified to be discharged to the high-pressure fluid side, thereby lubricating the sealing face while preventing leakage to the low-pressure fluid side. This example is also advantageous when the sliding component rotates in both directions.

In FIG. 3 (d), the extremely shallow thin grooves 10 are formed along the diameter direction. Accordingly, the fluid on the sealing face is rectified to flow to the low-pressure fluid side from the extremely shallow parallel grooves 2. Accordingly, the fluid flows into the entire sealing face with ease even at startup or stop of the sliding component and consequently the lubrication characteristics of the sliding component at startup or stop can be improved. From the viewpoint of preventing leakage, this is suitable when the seal area 3 formed between the extremely shallow thin grooves 10 and inner periphery of the seal area is wide.

The operations and effects of the sliding component in the embodiments of the present invention are as follows:

The extremely shallow parallel grooves 2 constituting the positive pressure-generating mechanisms are extremely shallow and satisfy the relationship of "Groove depth h>Roughness α at the bottom of the groove" and therefore the sealed fluid entering the extremely shallow parallel grooves 2 forms an extremely thin fluid film and the action of its surface tension increases the pressure region where the fluid can be sealed without increasing leakage. In the rotation phase, dynamic pressure generates as a result of the applicable sealing face sliding relative to the mating sealing face and the sealing face is lifted by the minimum required amount due to the dynamic pressure effect. Also because extremely shallow thin grooves 10 are formed on the sealing face S on the low-pressure fluid side of the extremely shallow parallel grooves 2, the flow of fluid on the sealing face S on the low-pressure fluid side of the extremely shallow parallel grooves 2 can be controlled, and by setting the extremely shallow thin grooves 10 in a desired direction and thereby adjusting the flow direction of fluid on the sealing face so that the fluid will flow over the entire sealing face or by guiding the fluid taken into the sealing face to be discharged to the high-pressure fluid side, the lubrication characteristics of the sealing face can be improved and leakage reduced at the same time.

Also, the extremely shallow parallel grooves 2 have their depth h set in a range of 10 nm to 1 μm or preferably in a range of 50 to 500 nm, while the extremely shallow thin grooves 10 have their depth h set equivalent to that of the extremely shallow parallel grooves and pitch p set in a range of 1 to 500 the lubrication characteristics at startup or stop can be improved significantly without increasing leakage.

Also, the extremely shallow thin grooves 10 are formed in a manner inclined by a specified angle relative to the sliding direction of the sealing face S, and accordingly the fluid on the sealing face can be rectified to flow toward a desired direction, so that the lubrication characteristics at startup or stop can be improved significantly without increasing leakage.

Also, the extremely shallow thin grooves 10 are formed in a manner inclined in the same direction as the rotating direction of the mating sliding member from the outer side to inner side in the diameter direction, and accordingly the fluid on the sealing face S can be rectified to flow to the low-pressure fluid side, so that the sealing face S can be sufficiently lubricated.

Also, the extremely shallow thin grooves 10 are formed in a manner inclined in the direction opposite to the rotating direction of the mating sliding member from the outer side to the inner side in the diameter direction, and accordingly the fluid on the sealing face S can be rectified to flow to the high-pressure fluid side, so that leakage to the low-pressure fluid side can be prevented further.

Also, the extremely shallow thin grooves 10 are formed in such a way that the adjacent extremely shallow thin grooves are inclined in the directions symmetrical relative to the rotating direction of the mating sliding member, and accordingly the fluid on the sealing face S is taken in from the high-pressure fluid side to the low-pressure fluid side and discharged to the high-pressure fluid side, so that the sealing face can be lubricated sufficiently and leakage to the low-pressure fluid side can be prevented further. This is also advantageous when the sliding component rotates in both directions.

Also, the extremely shallow thin grooves 10 are formed along the diameter direction, and accordingly the fluid on the sealing face is rectified to flow to the low-pressure fluid side from the extremely shallow parallel grooves 2, so that the fluid flows into the entire sealing face with ease even at the startup or stop of the sliding component and consequently the lubrication characteristics of the sliding component at startup or stop can be improved. From the viewpoint of preventing leakage, these characteristics are suitable when the seal area formed between the extremely shallow thin grooves 10 and inner periphery of the seal area is wide.

Preferably the extremely shallow parallel grooves 2 are provided to account for 5 to 70% of the area of the sealing face, and accordingly the surface pressure of the sealing face can be kept in good condition, while at the same time leakage can be reduced and the lubrication characteristics at startup or stop can be improved significantly.

The pair of sliding parts is comprised of ring-shaped bodies each used as either a stationary-side sliding member or rotating-side sliding member of a mechanical seal that rotates relative to the other member, and accordingly a mechanical seal that can maintain good lubrication performance without increasing leakage and also significantly improve the lubrication characteristics at startup or stop in particular can be obtained. A mechanical seal where the flow of fluid on the sealing face can be controlled, while the lubrication characteristics of the sealing face can be improved and leakage reduced at the same time, can also be provided.

The foregoing explained embodiments of the present invention using the drawings, but it should be noted that specific constitutions of the present invention are not at all limited to these embodiments, and any modifications and additions thereto are also included in the scope of the present invention so long as they do not deviate from the key points of the present invention.

In the aforementioned embodiment, for example, an example of using the sliding component for one of the pairs of seal ring for rotation and seal ring for fixing in mechanical seal devices was explained, but the sliding component can also be used as a bearing that slides against its rotating axis while sealing lubricating oil on one side of the cylindrical sealing face in the axial direction.

Also the aforementioned embodiment, a case where high-pressure sealed fluid is present on the outer periphery side was explained, for example, but the present invention can also be applied when high-pressure fluid is present on the inner periphery side, in which case the extremely shallow parallel grooves can be provided in a manner connected to the inner periphery side.

REFERENCE SIGNS

1 Sliding component
2 Extremely shallow parallel groove
3 Seal area
10 Extremely shallow thin groove
S Sealing face

The invention claimed is:

1. A sliding component characterized in that:
on one sealing face of a pair of sliding parts that slide relative to each other, multiple positive pressure-generating mechanisms that comprise extremely shallow parallel grooves running roughly in parallel with the sealing face and having a submicron-level depth are provided independently in a circumferential direction, and
each extremely shallow parallel groove is a recess defined by two sides in the circumferential direction and a bottom wherein a side of the recess at a high-pressure fluid side is open thereto in a radial direction and communicates therewith, and a side of the recess at a low-pressure fluid side is open to and communicates with multiple extremely shallow thin grooves which are formed on the sealing face on the low-pressure fluid side of the extremely shallow parallel grooves, wherein each extremely shallow parallel groove communicates with a different set of multiple extremely shallow thin grooves, and the extremely shallow thin grooves are isolated from the low-pressure fluid side by a seal area.

2. A sliding component according to claim 1, characterized in that: the extremely shallow parallel grooves have a depth h of 10 nm to 1 μm and roughness α of 1 to 100 nm at a bottom of the groove, where a relationship of h>α is satisfied; and the extremely shallow thin grooves have a depth h equivalent to that of the extremely shallow parallel grooves and pitch p of 1 to 500 μm.

3. A sliding component according to claim 2, characterized in that preferably the extremely shallow parallel grooves have a depth h of 50 to 500 nm and roughness α of 1 to 30 nm at a bottom of the groove, where a relationship of h>α is satisfied.

4. A sliding component according to claim 1, characterized in that the extremely shallow thin grooves are formed in a manner inclined by a specified angle relative to a sliding direction of the sealing face.

5. A sliding component according to claim 4, characterized in that the extremely shallow thin grooves are formed in a manner inclined in a same direction as a rotating direction of a mating sealing face.

6. A sliding component according to claim 4, characterized in that the extremely shallow thin grooves are formed in a manner inclined in a direction opposite to a rotating direction of a mating sealing face.

7. A sliding component according to claim 4, characterized in that the extremely shallow thin grooves are formed in such a way that adjacent extremely shallow thin grooves are oriented in directions symmetrical relative to a sliding direction of the sealing face.

8. A sliding component according to claim 1, characterized in that the extremely shallow thin grooves are formed along a diameter direction.

9. A sliding component according to claim 1, characterized in that preferably the extremely shallow parallel grooves are provided to account for 5 to 70% of an area of the sealing face.

10. A sliding component according to claim 1, characterized in that the pair of sliding parts is comprised of ring-shaped bodies each used as either a stationary-side sliding member or rotating-side sliding member of a mechanical seal that rotates relative to the other member.

11. A sliding component according to claim 2, characterized in that the extremely shallow thin grooves are formed in a manner inclined by a specified angle relative to a sliding direction of the sealing face.

12. A sliding component according to claim 2, characterized in that the extremely shallow thin grooves are formed along a diameter direction.

13. A sliding component according to claim 2, characterized in that preferably the extremely shallow parallel grooves are provided to account for 5 to 70% of an area of the sealing face.

14. A sliding component according to claim 2, characterized in that the pair of sliding parts is comprised of ring-shaped bodies each used as either a stationary-side sliding member or rotating-side sliding member of a mechanical seal that rotates relative to the other member.

15. A sliding component according to claim 3, characterized in that the extremely shallow thin grooves are formed in a manner inclined by a specified angle relative to a sliding direction of the sealing face.

16. A sliding component according to claim 3, characterized in that the extremely shallow thin grooves are formed along a diameter direction.

17. A sliding component according to claim 3, characterized in that preferably the extremely shallow parallel grooves are provided to account for 5 to 70% of an area of the sealing face.

18. A sliding component according to claim 3, characterized in that the pair of sliding parts is comprised of ring-shaped bodies each used as either a stationary-side sliding member or rotating-side sliding member of a mechanical seal that rotates relative to the other member.

19. A sliding component according to claim 4, characterized in that preferably the extremely shallow parallel grooves are provided to account for 5 to 70% of an area of the sealing face.

20. A sliding component according to claim 4, characterized in that the pair of sliding parts is comprised of ring-shaped bodies each used as either a stationary-side sliding member or rotating-side sliding member of a mechanical seal that rotates relative to the other member.

* * * * *